United States Patent
Gau et al.

(10) Patent No.: US 10,322,611 B2
(45) Date of Patent: Jun. 18, 2019

(54) SYSTEM FOR AN AIR MAINTENANCE TIRE ASSEMBLY

(71) Applicant: The Goodyear Tire & Rubber Company, Akron, OH (US)

(72) Inventors: Jin-Shy Steve Gau, Hudson, OH (US); Cheng-Hsiung Lin, Hudson, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 412 days.

(21) Appl. No.: 15/381,242

(22) Filed: Dec. 16, 2016

(65) Prior Publication Data

US 2018/0170126 A1    Jun. 21, 2018

(51) Int. Cl.
  *B60C 23/00* (2006.01)
  *B60C 23/12* (2006.01)

(52) U.S. Cl.
  CPC ............ *B60C 23/004* (2013.01); *B60C 23/12* (2013.01)

(58) Field of Classification Search
  CPC .............................. B60C 23/004; B60C 23/12
  USPC .......................................... 152/416, 417, 418
  See application file for complete search history.

(56) References Cited

U.S. PATENT DOCUMENTS

| | | |
|---|---|---|
| 2,541,860 A | 2/1951 | Cawley |
| 3,931,843 A | 1/1976 | Edwards |
| 3,967,670 A | 7/1976 | Brickwood |
| 4,149,579 A | 4/1979 | Senger |
| 4,349,064 A | 9/1982 | Booth |
| 4,570,691 A | 2/1986 | Martus |
| 5,180,455 A | 1/1993 | Cheng |
| 5,201,968 A | 4/1993 | Renier |
| 5,355,924 A | 10/1994 | Olney |
| 5,556,489 A | 9/1996 | Curlett |
| 5,558,730 A | 9/1996 | Olney |
| 6,474,383 B1 | 11/2002 | Howald |
| 6,725,895 B1 | 4/2004 | Tsipov |
| 6,744,356 B2 | 6/2004 | Hamilton |
| 6,880,598 B2 | 4/2005 | Haunhorst |
| 7,117,910 B2 | 10/2006 | Akahori |
| 7,237,590 B2 | 7/2007 | Loewe |
| 7,322,392 B2 | 1/2008 | Hawes |
| 7,357,164 B2 | 4/2008 | Loewe |

(Continued)

OTHER PUBLICATIONS

European Search Report dated Apr. 5, 2018 for Application Serial No. EP17206689.

*Primary Examiner* — S. Joseph Morano
*Assistant Examiner* — Jean W Charleston
(74) *Attorney, Agent, or Firm* — Robert N. Lipcsik

(57) ABSTRACT

A system is used with a pneumatic tire mounted on a wheel rim to keep a tire cavity of the pneumatic tire from becoming underinflated from a set pressure. The first system includes a plurality of pumps attached circumferentially to the wheel rim, each pump having a piston for inflating the tire cavity and a weight for moving the piston, and a stop mechanism for each pump, the stop mechanism including a stop piston, a stop cylinder, a first spring, and a second spring, when air pressure in the tire cavity reaches the set pressure, the set pressure overcomes a force of the first spring against the stop piston and moves the stop piston into a stopping engagement with the weight, when air pressure in the tire cavity is below the set pressure, the second spring overcomes the force of the first spring and moves the stop piston away from the weight.

20 Claims, 9 Drawing Sheets

(56) References Cited

U.S. PATENT DOCUMENTS

| | | |
|---|---|---|
| 7,748,422 B2 | 7/2010 | Bol |
| 7,784,513 B2 | 8/2010 | Loewe |
| 7,891,393 B1 | 2/2011 | Czarno |
| 7,911,332 B2 | 3/2011 | Caretta |
| 7,926,521 B2 | 4/2011 | Izumoto |
| 8,327,897 B2 | 12/2012 | Firestone |
| 8,474,500 B2 | 7/2013 | Caretta |
| 8,807,182 B2 * | 8/2014 | Kelly .................. B60C 23/12 |
| | | 152/419 |
| 9,327,562 B2 | 5/2016 | Lin |
| 2005/0274442 A1 * | 12/2005 | Huang ............... B60C 23/0408 |
| | | 152/415 |
| 2010/0078109 A1 | 4/2010 | Wilson |
| 2010/0282388 A1 | 11/2010 | Kelly |
| 2014/0102610 A1 * | 4/2014 | Lin ..................... B60C 23/12 |
| | | 152/450 |
| 2014/0174620 A1 * | 6/2014 | Hinque ................ B60C 23/12 |
| | | 152/450 |
| 2015/0147198 A1 | 5/2015 | Chawla |
| 2015/0314657 A1 | 11/2015 | Lin |
| 2016/0167465 A1 | 6/2016 | Hinque |
| 2018/0086161 A1 | 3/2018 | Lin |

\* cited by examiner

SYSTEM FOR AN AIR MAINTENANCE TIRE ASSEMBLY

FIELD OF THE INVENTION

The present invention relates to a system and method for maintaining appropriate air pressure within a pneumatic tire. More specifically, the present invention relates to a rim mounted system for directing air into a tire cavity of a pneumatic tire.

BACKGROUND OF THE INVENTION

Conventional pneumatic tires are designed to perform for relatively long periods of time. In many cases, automobile tires are now expected to have a useful service life of 30,000, 50,000, or 70,000 miles. However, even long-life pneumatic tires are subject to air pressure losses due to puncture by nails and other sharp objects, temperature changes, and/or diffusion of air through the tire itself.

Since air diffusion reduces tire pressure over time, the pneumatic tires are often continually underinflated. Accordingly, drivers must repeatedly act to maintain tire pressures or fuel economy, tire life, and/or vehicle braking and handling performance will be reduced. Tire Pressure Monitoring Systems (TPMS) have been proposed to warn drivers when tire pressure is significantly low. Such systems, however, remain dependent upon a driver taking remedial action, when warned, to re-inflate a tire to the recommended pressure. It is desirable, therefore, to incorporate an air maintenance feature within a pneumatic tire that will maintain recommended air pressure without requiring bothersome driver intervention.

SUMMARY OF THE INVENTION

A first system in accordance with the present invention is used with a pneumatic tire mounted on a wheel rim to keep a tire cavity of the pneumatic tire from becoming underinflated from a set pressure. The first system includes a plurality of pumps attached circumferentially to the wheel rim, each pump having a piston for inflating the tire cavity and a weight for moving the piston, and a stop mechanism for each pump, the stop mechanism including a stop piston, a stop cylinder, a first spring, and a second spring, when air pressure in the tire cavity reaches the set pressure, the set pressure overcomes a force of the first spring against the stop piston and moves the stop piston into a stopping engagement with the weight, when air pressure in the tire cavity is below the set pressure, the second spring overcomes the force of the first spring and moves the stop piston away from the weight.

According to another aspect of the first system, the first spring is disposed internally to the stop cylinder with the first spring engaging both an upper end of the stop cylinder and the stop piston.

According to still another aspect of the first system, the second spring is disposed internally to the stop cylinder with the second spring engaging both a lower end of the stop cylinder and the stop piston.

According to yet another aspect of the first system, the stop cylinder has a first port pneumatically connected to the tire cavity.

According to still another aspect of the first system, the stop cylinder has a second port pneumatically connected to ambient pressure conditions.

According to yet another aspect of the first system, the plurality of pumps and the control valve define a multi-chamber pump configuration.

According to still another aspect of the first system, two chambers within the pump are connected by a narrow passage having a one-way check valve.

According to yet another aspect of the first system, the plurality of pumps define a force control system with a maximum pumping capability determined by a piston of each pump moving a maximum distance within each pump.

According to still another aspect of the first system, each pump includes a first diaphragm limiting motion of a piston in a first direction and a second diaphragm limiting motion of the piston in a second opposite direction.

According to yet another aspect of the first system, pump parameters include a piston mass parameter, a first piston travel parameter, a second piston travel parameter, mass parameter of the weight.

A second system in accordance with the present invention models a pneumatic tire mounted on a wheel rim and a pumping mechanism mounted on the wheel rim to keep a tire cavity of the pneumatic tire from becoming underinflated from a set pressure. The second system includes a plurality of pumps attached circumferentially to the wheel rim, each pump having pump parameters, a control valve for controlling inlet air into a tire cavity of the pneumatic tire, the control valve having valve parameters, the system predicting system performance under various configurations and conditions through use of the pump parameters and the valve parameters; and a stop mechanism for each pump, the stop mechanism including a stop piston, a stop cylinder, a first spring, and a second spring.

According to another aspect of the second system, when air pressure in the tire cavity reaches the set pressure, the set pressure overcomes a force of the first spring against the stop piston and moves the stop piston into a stopping engagement with the weight.

According to still another aspect of the second system, when air pressure in the tire cavity is below the set pressure, the second spring overcomes the force of the first spring and moves the stop piston away from the weight.

According to yet another aspect of the second system, the plurality of pumps and the control valve define a multi-chamber pump configuration.

According to still another aspect of the second system, each stop cylinder of each stop mechanism includes two chambers on either side of the piston.

According to yet another aspect of the second system, each pump includes two chambers connected by a narrow passage having a one-way check valve.

According to still another aspect of the second system, the pumps are fit to the wheel rim; set $P_R(i)=P_L(i)=P_0$, i=1 to n (total number of pumps used); set $x(i)=0$ and $\theta(i)=2\pi/n(i-1)$; $P_L(0)=P_0$ (always) and $P_R(n+1)=P_{tire}$ (the tire cavity); calculate new $x(i)$, $P_R(i)$ and $P_L(i)$; determine check valve status: if $P_R(i) \geq P_L(i)+Pcr$, then check valve is open; if $P_L(i-1) \geq P_R(i)+Pcr$, then adjacent check valve is open; balance pressure between connected chamber and reset check valve to close; and recalculate $x(i)$, $P_R(i)$ and $P_L(i)$ until no more open check valve.

According to yet another aspect of the second system, subsequently, the wheel rim rotates to a predefined step angle; calculate new $x(i)$, $P_R(i)$ and $P_L(i)$; determine check valve status: if $P_R(i) \geq P_L(i)+Pcr$ then check valve is open; if $P_L(i-1) \geq P_R(i)+Pcr$ then adjacent check valve is open; balance pressure between connected chamber and reset check valve to close; and recalculate x(i), $P_R(i)$ and $P_L(i)$ until no more open check valve.

According to still another aspect of the second system, the plurality of pumps define a force control system with a maximum pumping capability determined by a piston of each pump moving a maximum distance within each pump.

According to yet another aspect of the second system, the pump parameters include a piston mass parameter, a first piston travel parameter, a second piston travel parameter, and a mass parameter of the weight.

DETAILED DESCRIPTION OF DRAWINGS

The following drawings are illustrative of examples of the present invention.

DETAILED DESCRIPTION OF EXAMPLES OF THE PRESENT INVENTION

Figure 1:
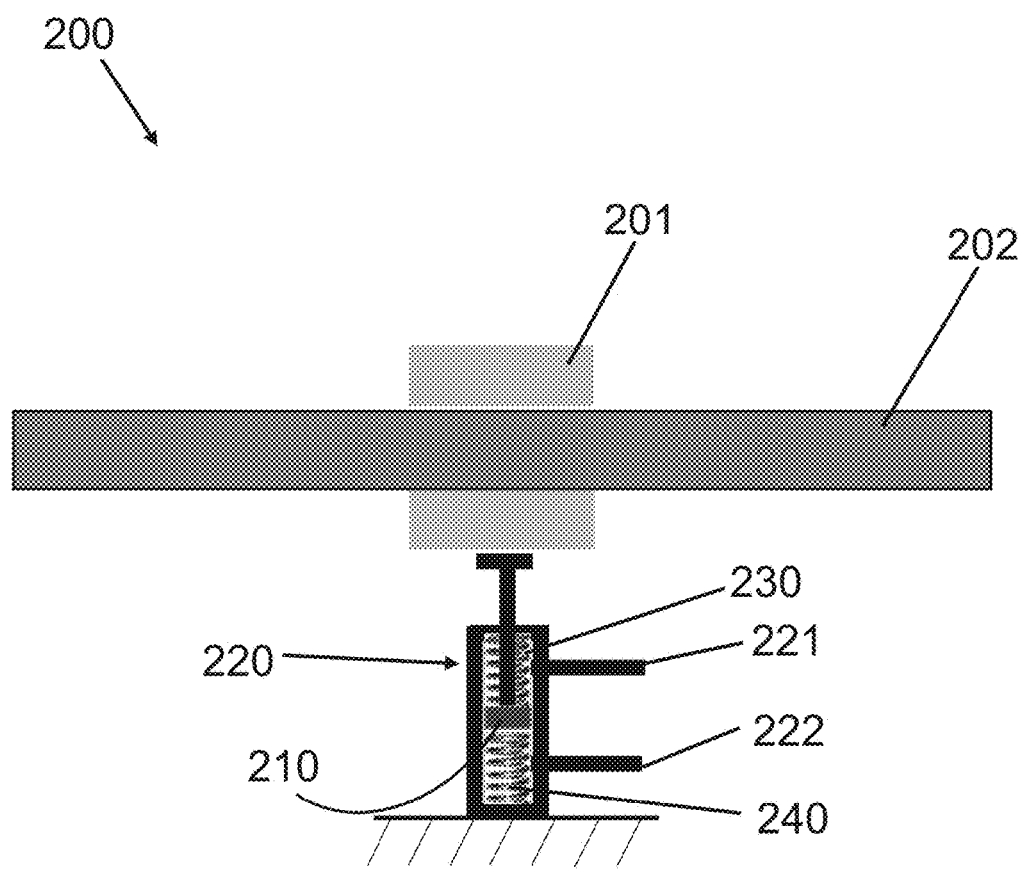
FIG. 1 is a schematic representation of part of a system in accordance with the present invention.

As shown in FIGS. 3 through 9, an example air maintenance tire system 10 for use with the present invention may provide a low profile and effective multi-chamber pump system that may easily mount inside of a wheel rim 12 with no significant modification to the wheel rim (minor modification may be required for air inlet having two stems). Further, the air maintenance tire system 10 requires no significant changes to tire/wheel assembly or tire/wheel performance.

The air maintenance tire 10 may include a pumping mechanism, pump driving mechanism, or pump 14, utilizing gravitational force changes during rotation of the air maintenance tire. The pump driving mechanism 14 may include use of a mass of a piston body 16 moving against a pair of diaphragms 19 or an external mass (not shown) driving the piston body using a cam/gear system. If the mass of the piston body 16 is used, the pump driving mode may be based on force control. If a cam/gear system and external mass are used, gravitational force may drive gear rotation and convert this rotation to controllable displacement, as described in U.S. Publication No. 2015/0314657, System for an Air Maintenance Tire Assembly, herein incorporated by reference in its entirety.

As the tire/wheel rotates, the piston body 16 may travel in a forward direction and an opposite backward direction per each revolution thereby producing a high pumping frequency. Thus, higher vehicle speed may provide higher pumping frequency. The parameters of the pumping action depend upon the mass and angular velocity of the tire/wheel assembly. Tire load or other external conditions may not effect pumping action.

Due to an amplification effect, the compression of the pump driving mechanism 14 may be defined as:

$$R = (r)^{2n}$$

where
R: system compression ratio
r: single chamber compression ratio
n: number of pump in the system Thus, a high compression ratio for each pump 18 is not necessary to achieve a high compression ratio (e.g., low force and/or deformation may produce high compression).

The pump driving mechanism 14 may include 4 to 10 pumps 18 and pump holders 20 may be configured linearly on a belt forming a loop and fitting circumferentially in a middle groove of the wheel rim 12 (radially innermost part of the wheel rim). A control valve 22 may be shaped similarly to the pumps 18 and may be placed in a space between the beginning and the end of the belt. Pump holders 20 may have adjustable lengths that fit any size of wheel rim 12.

Figure 5:
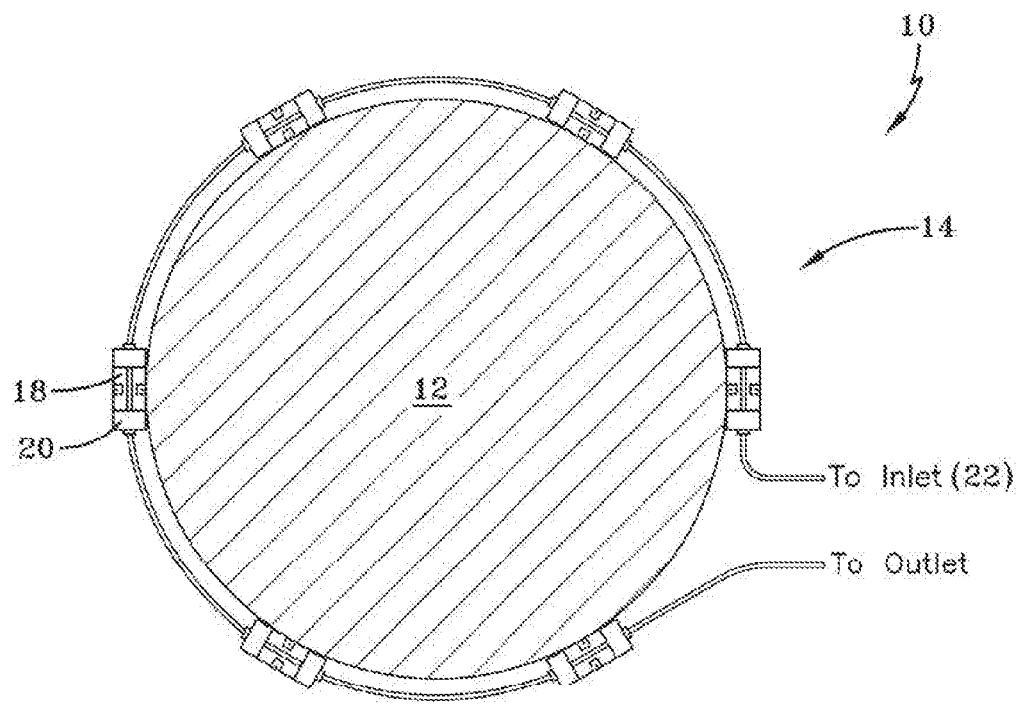
FIG. 5 is a schematic representation of another example system for use with the present invention.

A passage connection from a first valve stem to the control valve inlet port may be connected after the belt is secured to wheel rim 12 (FIG. 5). The control valve 22 may include a filter unit 30. The pump driving mechanism 14 may be bi-directional and mounted in either direction. The control valve 22 may include an adjustment for varying a set pressure for the tire cavity. The pump driving mechanism 14 thus may have a low profile around the wheel rim 12 that in no way interferes with tire mount/dismount and provides clearance in the tire cavity for impacts incurred (cleat or pothole) during driving of the vehicle. Further, the 360° design (FIG. 5) of the pump driving mechanism 14 may be a balanced construction in no way degrading the balance of the tire/wheel assembly.

Figure 7:
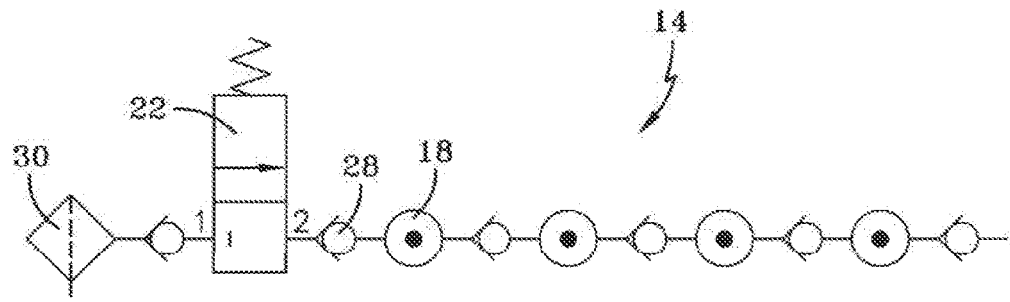
FIG. 7 is a schematic representation of part of still another example system for use with the present invention.

FIG. 7 shows of an example configuration having four pumps 18, six check valves 28, a control valve 22, and a filter 30. This configuration may scale to n pumps 18 with the control valve 22 controlling air inlet into the configuration from outside of the tire 10. The check valve 28 to the left of the control valve 22 in FIG. 7 may be optional.

Figure 8:
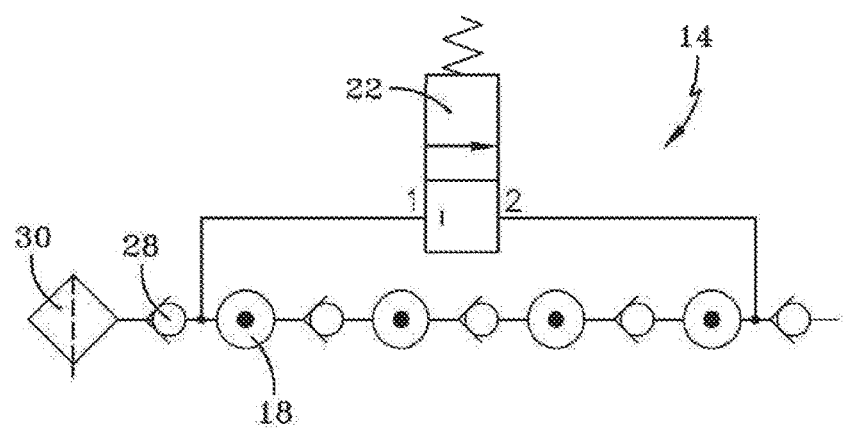
FIG. 8 is a schematic representation of another part of the example system of FIG. 7.

FIG. 8 shows of another example configuration having four pumps 18, five check valves 28, a control valve 22, and a filter 30. This configuration may scale to n pumps 18 with the control valve 22 controlling air outlet from the configuration to the tire cavity. The control valve 22 may be placed in a bypass of the pumps 18.

Figure 9:
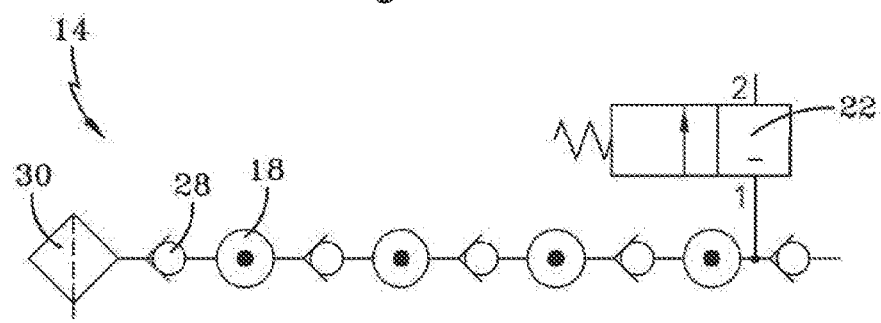
FIG. 9 is a schematic representation of still another part of the example system of FIG. 7.

FIG. 9 shows of still another example configuration having four pumps 18, five six check valves 28, a control valve 22, and a filter 30. This configuration may scale to n pumps 18 with the control valve 22 controlling air outlet from the configuration to the tire cavity. The control valve 22 may be placed in series with the n pumps 18.

A pumping system, theory, or analytical model 100 for use with the present invention may define behavior of the multi-chamber pump system described above (FIGS. 3-9). Such a system may be converted to suitable computer codes as an analytical pumping model. This model may design and predict system performance under various configurations and conditions for both consumer and commercial air maintenance tire systems.

Figure 2:
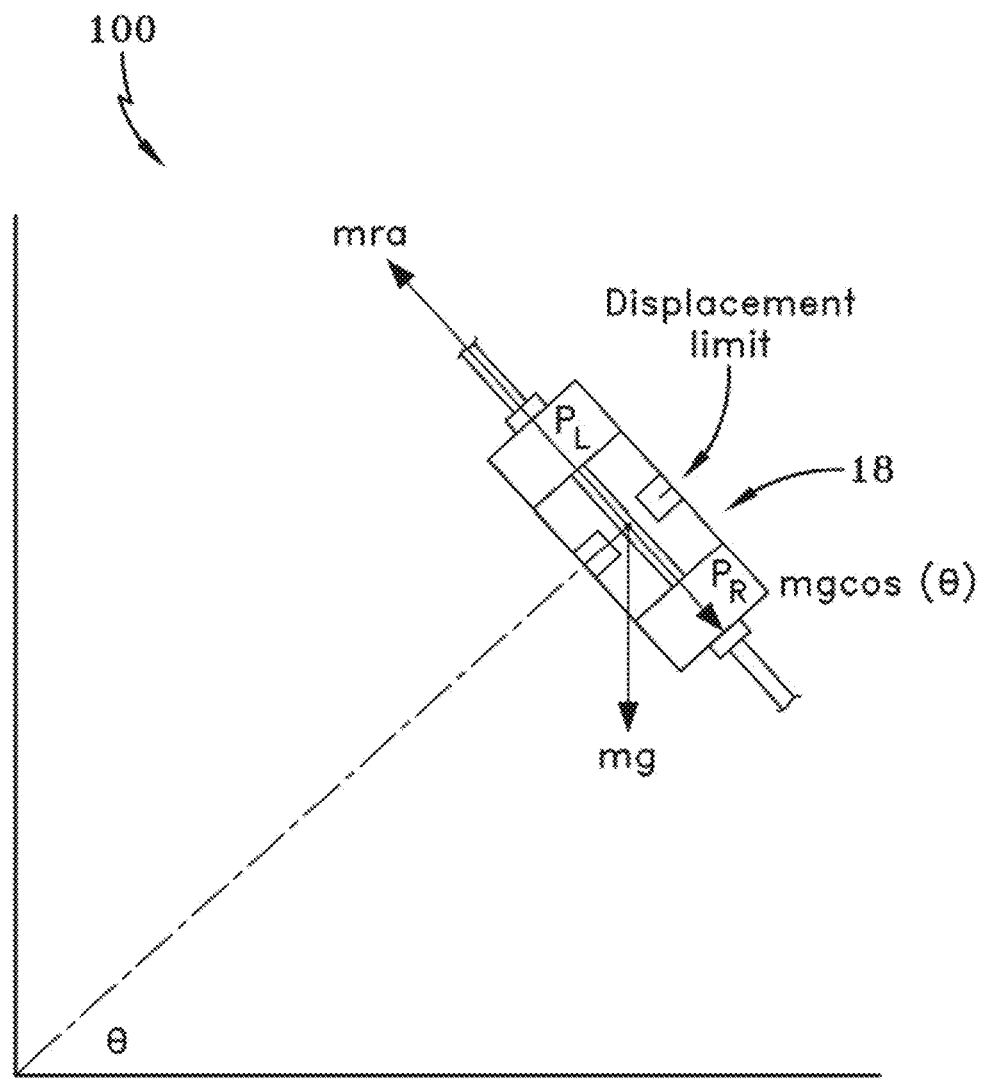
FIG. 2 is a schematic representation of part of a system for use with the present invention.
Figure 3:
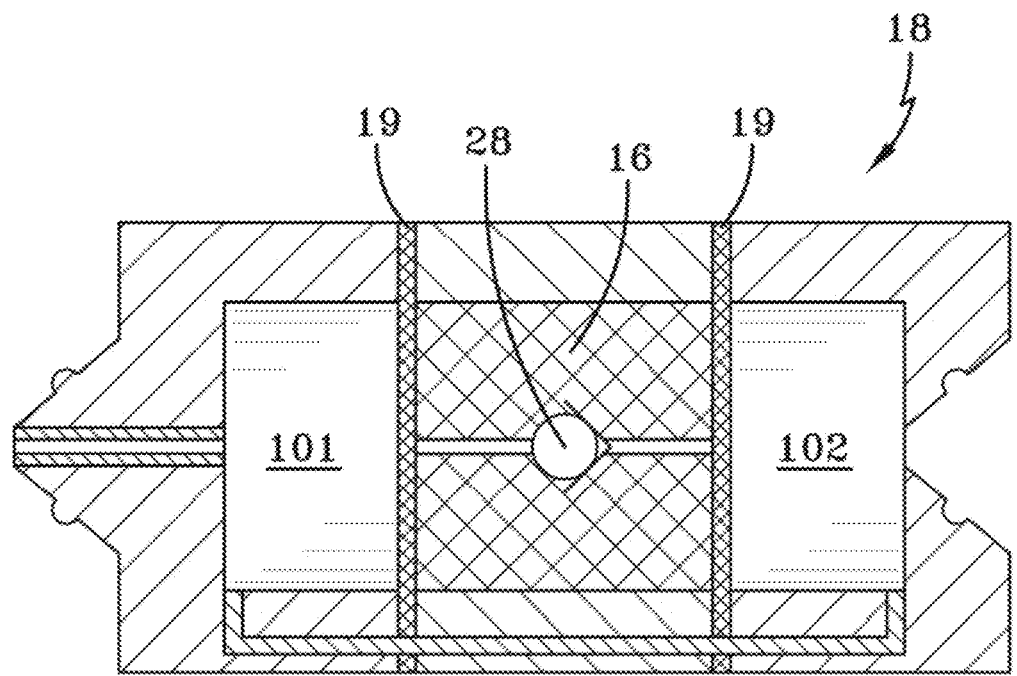
FIG. 3 is a schematic representation of part of a system for use with the present invention.
Figure 4:
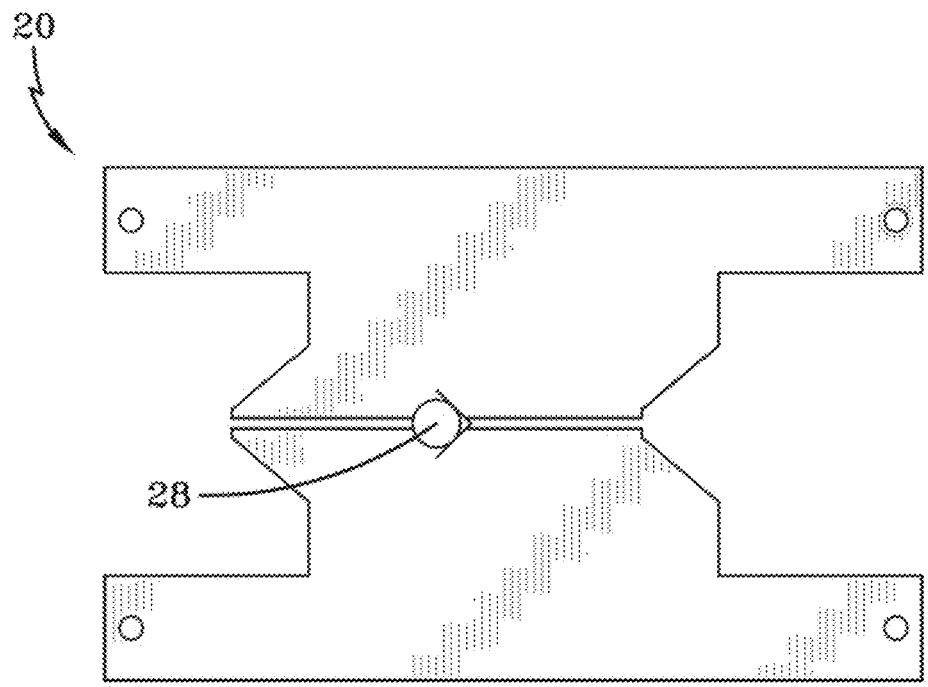
FIG. 4 is a schematic representation of another part of the system of FIG. 3.

There may be n pumps spaced equally about the circumference of the wheel rim 12. Each pump 18 may include one piston 16 placed between two chambers 101, 102, as described above (FIG. 2). The two chambers 101, 102 may be connected by a narrow passage having the one-way valve 28, or CV(i), with i=1 to n (FIGS. 4-8). CV(n+1) and CV(n+2) may be placed at the air inlet and outlet of the system 10, and between the pumps 18, CV(i), i=1 to n.

Figure 6:
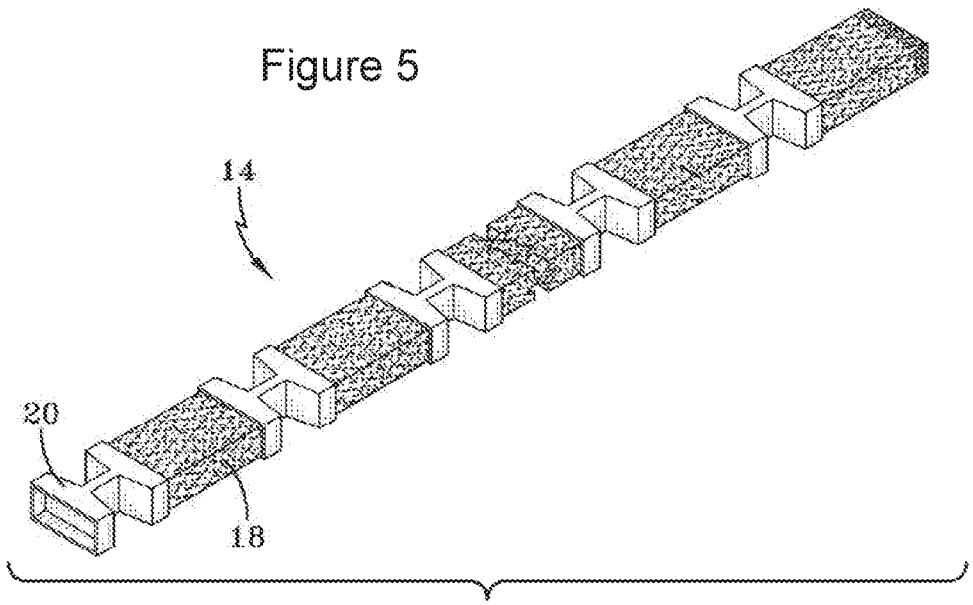
FIG. 6 is a schematic representation of part of the example system of FIG. 5.

For example (FIG. 1):
Step 0
Flow flat assembly to fit to rim (FIGS. 5 & 6);
Set $P_R(i)=P_L(i)=P_0$, i=1 to n (total number of pumps 18 used);
Set x(i)=0 and $\theta(i)=2\pi/n(i-1)$;
$P_L(0)=P_0$ (always) and $P_R(n+1)=P_{tire}$ (the tire cavity);
Calculate new x(i), $P_R(i)$ and $P_L(i)$;
Determine check valve status:
   If $P_R(i) \geq P_L(i)+Pcr$, then icv(i) is open;
   If $P_L(i-1) \geq P_R(i)+Pcr$, then icv(i-1) is open;
   Balance pressure between connected chamber and reset check valve to close; and
   Recalculate x(i), $P_R(i)$ and $P_L(i)$ until no more open check valve.
Step 1 to N
Rotate wheel to a predefined step angle;
Calculate new x(i), $P_R(i)$ and $P_L(i)$;
Determine check valve status:
   If $P_R(i) \geq P_L(i)+Pcr$ then icv(i) is open;
   If $P_L(i-1) \geq P_R(i)+Pcr$ then cv(i-1) is open;
   Balance pressure between connected chamber and reset check valve to close; and
   Recalculate x(i), $P_R(i)$ and $P_L(i)$ until no more open check valve.

The system 100 may also be exemplarily described:

---

Pump moved from $\theta$ to $\theta'$
Force components $\Delta PA$ and mg $\cos(\theta')$
where $\Delta P = P_L - P_R$
check force balance for piston movement
If
$\Delta PA + mg \cos(\theta') - mr\alpha > 0$ then piston moving to right
$\Delta PA + mg \cos(\theta') - mr\alpha < 0$ then piston moving to left
$\Delta PA + mg \cos(\theta') - mr\alpha = 0$ then piston no movement
x : current piston position relative to piston center ($-x_o \leq x \leq x_o$)
calculate new piston x' by using $\Delta P'A + mg \cos(\theta') - mr\alpha = 0$
where $\Delta P' = P_L' - P_R'$ $$P_L' = P_L \frac{(l+x)A + V_d}{(l+x')A + V_d}$$

$$P_R' = P_R \frac{(l-x)A + V_d}{(l-x')A + V_d}$$

where
l : chamber length at 0 position
$V_d$ : dead-end volume (imcompressible) of each chamber
$\alpha$ : Angular acceleration (typically around 4 to 7g)
maintain $-x_o \leq x' \leq x_o$
If $x' > x_o$ then $x' = x_o$
If $x' < -x_o$ then $x' = -x_o$

---

This system 100 (e.g., the air maintenance tire 10 described above) may be a force control system with a maximum pumping capability determined by the piston 16 moving a maximum distance to the right (FIG. 2), as limited by one of the diaphragms 19, $X(i)=Xo$ and $\Delta PA>m(r\alpha-g \cos \theta)$. The maximum pumping pressure may be $n\Delta P=n[m(r\alpha-g \cos \theta)]/A$ psig. For example, a 50 g piston with a 5.0 mm diameter for 6 pumps at a constant speed, ($\alpha=0$), $\Delta P$ may be 21.74 psig. A 50 g piston with a 5.0 mm diameter for 6 pumps at a 5.0 g acceleration, $\Delta P$ may be 130.43 psig. If the resistance, or cracking pressure Pcr, of the check valve 28 is not negligible, the maximum pumping pressure $\Delta P$ may be $n(\Delta P-Pcr)$. Thus, this system 100 may be driven by two forces components, gravitation G and acceleration A. The gravitation force G may provide a high frequency cyclic effect on the pumps 18 in a short distance. The acceleration force A may provide a low or medium frequency cyclic effect to ensure maximum pumping pressure.

Figure 10:
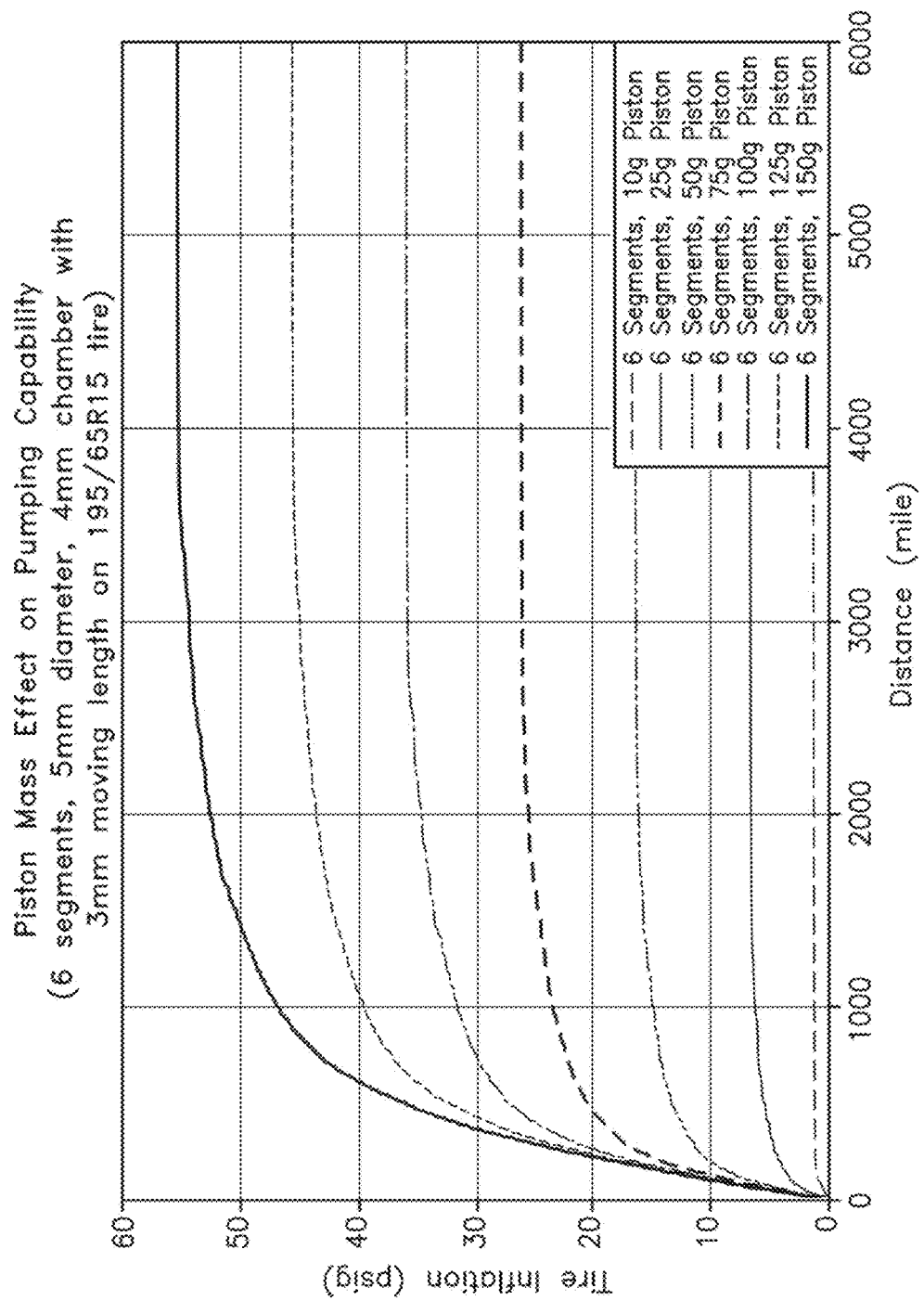
FIG. 10 illustrates the piston mass effect on pumping capability and pumping pressure.
Figure 11:
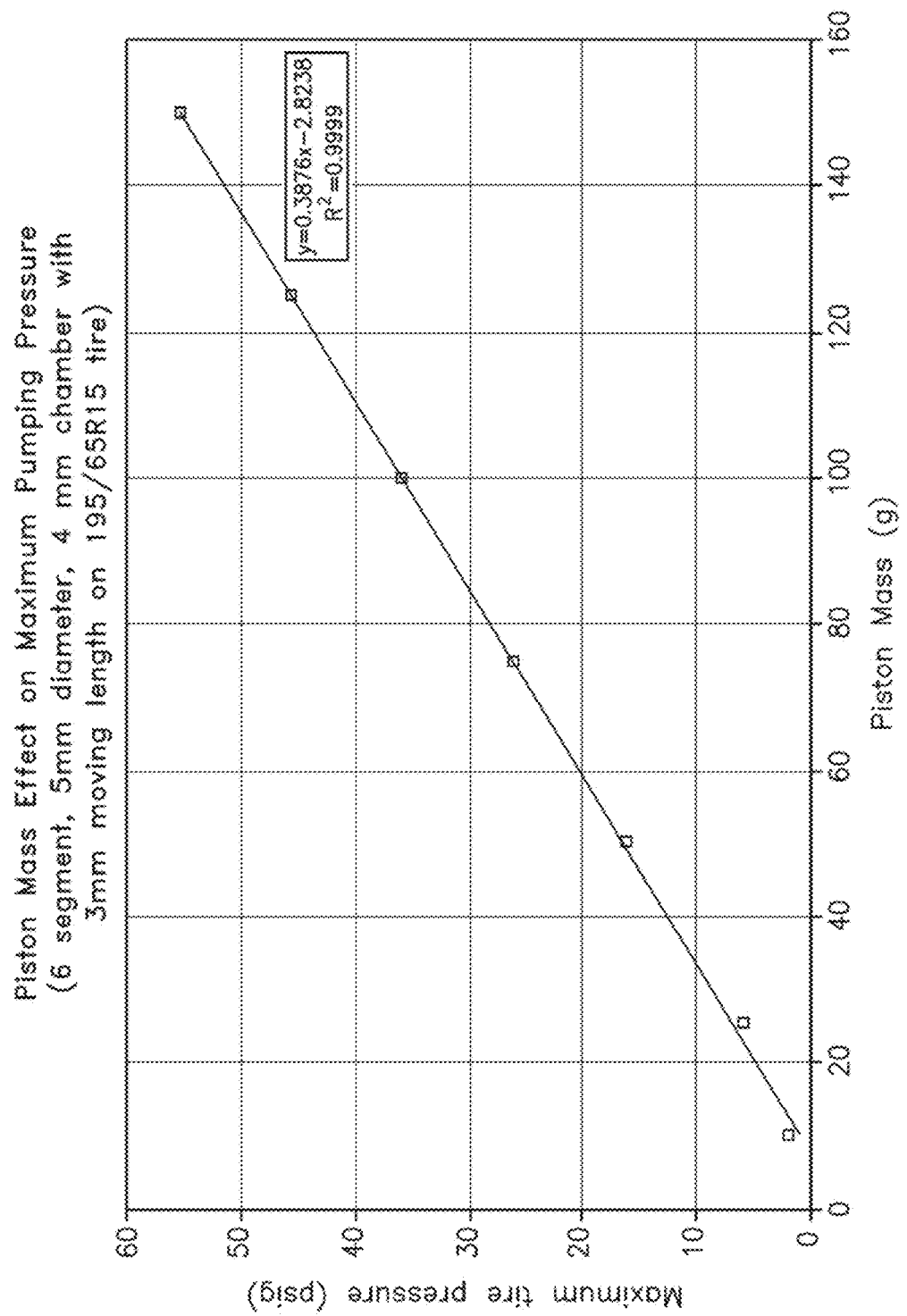
FIG. 11 illustrates the piston mass effect on pumping capability and pumping pressure.
Figure 12:
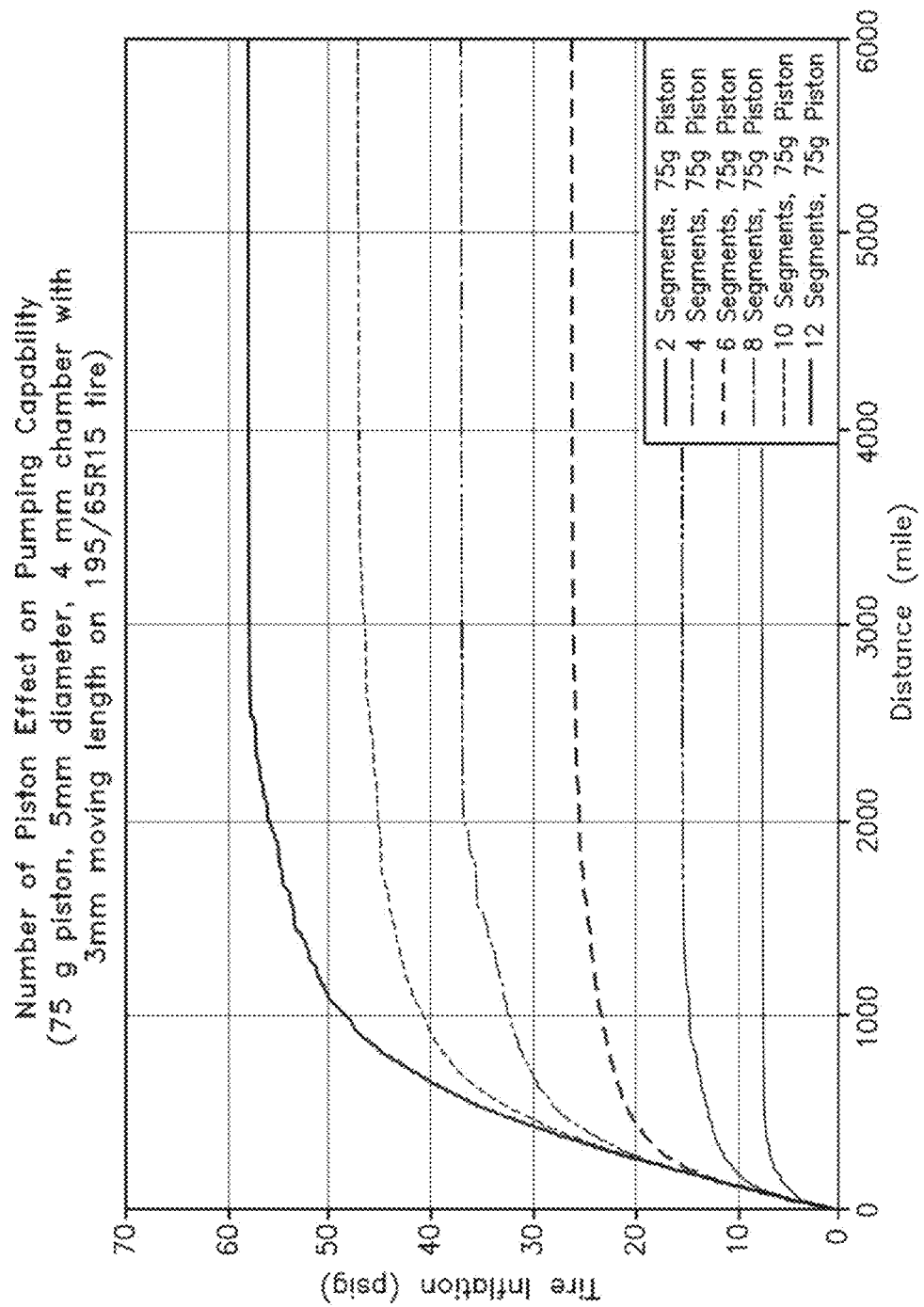
FIG. 12 illustrates the number of pistons effect on pumping capability and pumping pressure.
Figure 13:
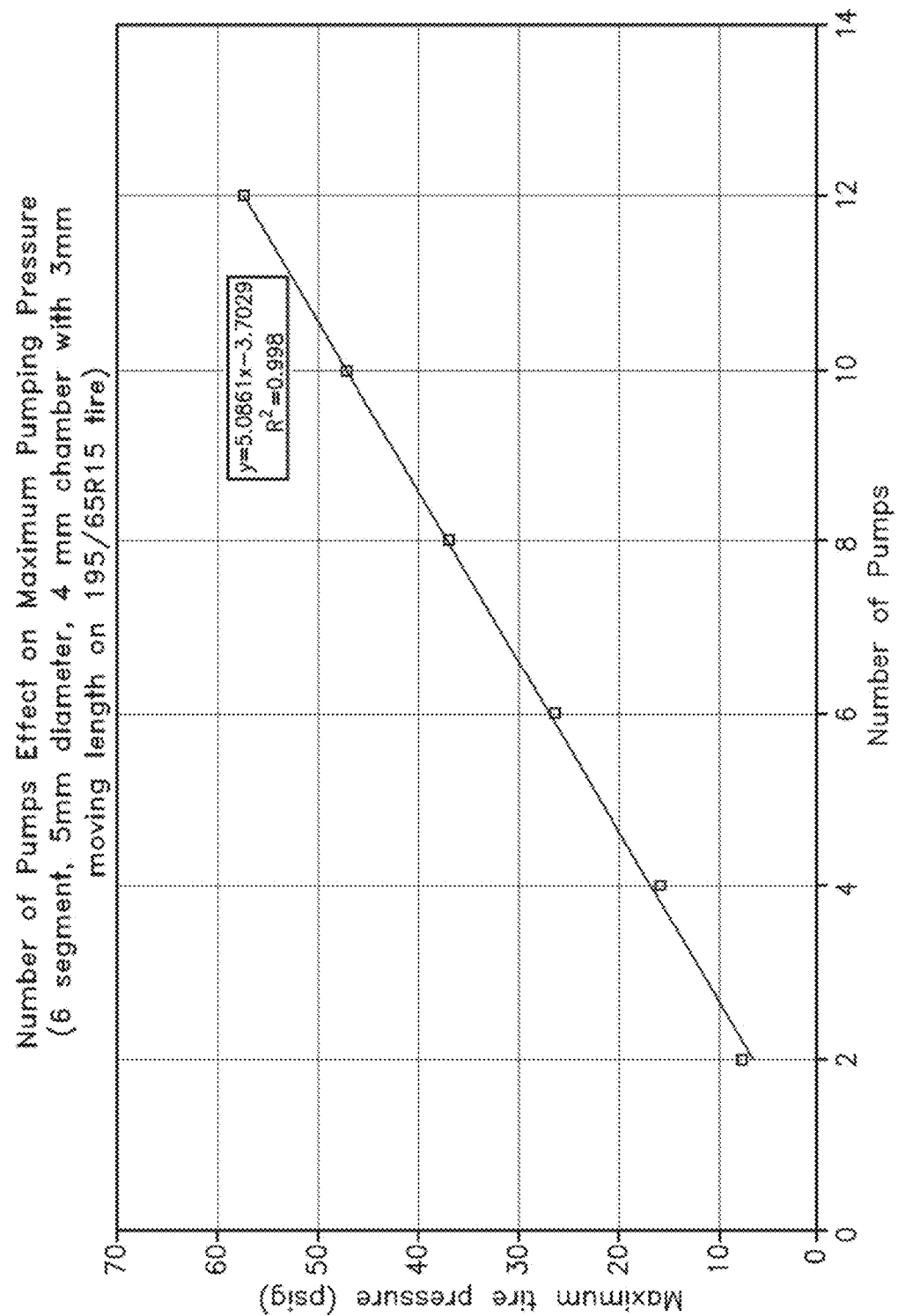
FIG. 13 illustrates the number of pistons effect on pumping capability and pumping pressure.

Under a first example condition, a piston mass effect under constant speed, 6 pumps with 5.0 mm piston diameters, 4.0 mm length chambers (e.g., 101, 102), and 3.0 mm maximum travel may be mounted on a 15" wheel/tire (FIGS. 10 & 11). Under a second example condition, a number of piston effect under constant speed, 75.0 g pistons with 5.0 mm diameters, 4.0 mm length chambers (e.g., 101, 102), and 3.0 mm maximum travel may be mounted on a 15" wheel/tire (FIGS. 12 & 13).

In accordance with the present invention, the example air maintenance tire system 10 may use a free weight 201 sliding on a rail 202 to move the piston 16 to pump air (FIG. 1). When the tire reaches the set pressure (e.g., 100 psi), however, the free weight may still move the piston 16 even though pressure is not needed. This unwanted piston movement may create unnecessary wear for the piston/pump 14, 16 and reduce the service life of the air maintenance tire system 10. This unnecessary wear may be mitigated and/or eliminated by stopping the movement of the weight and piston the set pressure is achieved in the tire cavity.

In accordance with the present invention and as shown in FIG. 1, a stop mechanism 200 for the weight 201 may include a stop piston 210, a stop cylinder 220, a first spring 230, and a second spring 240. The first spring 230 may be disposed internally to the stop cylinder 220 with the first spring engaging both the top end of the stop cylinder and the stop piston 210. The second spring 240 may be disposed internally to the stop cylinder 220 with the second spring engaging both the bottom end of the stop cylinder and the stop piston 210. The stop cylinder 220 may have a first port 221 pneumatically connected to the tire cavity and a second port 222 pneumatically connected to ambient or another predetermined pressure. When air pressure in the tire cavity reaches the set pressure, the set pressure may overcome the force of the first spring 230 against the stop piston 210 and move the stop piston into a stopping engagement with the weight 201 (FIG. 1). When air pressure in the tire cavity is below the set pressure, the second spring 240 may overcome the force of the first spring 230 inside the stop cylinder 220 and move the stop piston 210 away from the weight 201.

While certain representative examples and details have been shown for the purpose of illustrating the present invention, it will be apparent to those skilled in this art that various changes and modifications may be made therein without departing from the spirit or scope of the present invention.

What is claimed:
1. A system for use with a pneumatic tire mounted on a wheel rim to keep a tire cavity of the pneumatic tire from becoming underinflated from a set pressure, the system comprising:
   a plurality of pumps attached circumferentially to the wheel rim, each pump having a piston for inflating the tire cavity and a weight for moving the piston; and a stop mechanism for each pump, the stop mechanism including a stop piston, a stop cylinder, a first spring, and a second spring, when air pressure in the tire cavity reaches the set pressure, the set pressure overcomes a force of the first spring against the stop piston and moves the stop piston into a stopping engagement with the weight, when air pressure in the tire cavity is below the set pressure, the second spring overcomes the force of the first spring and moves the stop piston away from the weight.

2. The system as set forth in claim 1 wherein the first spring is disposed internally to the stop cylinder with the first spring engaging both an upper end of the stop cylinder and the stop piston.

3. The system as set forth in claim 1 wherein the second spring is disposed internally to the stop cylinder with the second spring engaging both a lower end of the stop cylinder and the stop piston.

4. The system as set forth in claim 1 wherein the stop cylinder has a first port pneumatically connected to the tire cavity.

5. The system as set forth in claim 1 wherein the stop cylinder has a second port pneumatically connected to ambient pressure conditions.

6. The system as set forth in claim 1 wherein the plurality of pumps and the control valve define a multi-chamber pump configuration.

7. The system as set forth in claim 1 further including two chambers within the pump connected by a narrow passage having a one-way check valve.

8. The system as set forth in claim 1 wherein the plurality of pumps define a force control system with a maximum pumping capability determined by a piston of each pump moving a maximum distance within each pump.

9. The system as set forth in claim 1 wherein each pump includes a first diaphragm limiting motion of a piston in a first direction and a second diaphragm limiting motion of the piston in a second opposite direction.

10. The system as set forth in claim 1 further including pump parameters with a piston mass parameter, a first piston travel parameter, a second piston travel parameter, mass parameter of the weight.

11. A system for modeling a pneumatic tire mounted on a wheel rim and a pumping mechanism mounted on the wheel rim to keep a tire cavity of the pneumatic tire from becoming underinflated from a set pressure, the system comprising:

a plurality of pumps attached circumferentially to the wheel rim, each pump having pump parameters;

a control valve for controlling inlet air into a tire cavity of the pneumatic tire, the control valve having valve parameters, the system predicting system performance under various configurations and conditions through use of the pump parameters and the valve parameters; and a stop mechanism for each pump, the stop mechanism including a stop piston, a stop cylinder, a first spring, and a second spring.

12. The system as set forth in claim 11 wherein, when air pressure in the tire cavity reaches the set pressure, the set pressure overcomes a force of the first spring against the stop piston and moves the stop piston into a stopping engagement with the weight.

13. The system as set forth in claim 11 wherein, when air pressure in the tire cavity is below the set pressure, the second spring overcomes the force of the first spring and moves the stop piston away from the weight.

14. The system as set forth in claim 11 wherein the plurality of pumps and the control valve define a multi-chamber pump configuration.

15. The system as set forth in claim 11 wherein each stop cylinder of each stop mechanism includes two chambers on either side of the piston.

16. The system as set forth in claim 11 wherein each pump includes two chambers connected by a narrow passage having a one-way check valve.

17. The system as set forth in claim 11 wherein:

the pumps are fit to the wheel rim;

set $P_R(i)=P_L(i)=P_0$, i=1 to n (total number of pumps used);

set $x(i)=0$ and $\theta(i)=2\pi/n(i-1)$;

$P_L(0)=P_0$(always) and $P_R(n+1)=P_{tire}$ (the tire cavity);

calculate new $x(i)$, $P_R(i)$ and $P_L(i)$;

determine check valve status:

if $P_R(i) \geq P_L(i)+Pcr$, then check valve is open;

if $P_L(i-1) \geq P_R(i)+Pcr$, then adjacent check valve is open;

balance pressure between connected chamber and reset check valve to close; and recalculate $x(i)$, $P_R(i)$ and $P_L(i)$ until no more open check valve.

18. The system as set forth in claim 17 wherein subsequently:

the wheel rim rotates to a predefined step angle;

calculate new $x(i)$, $P_R(i)$ and $P_L(i)$;

determine check valve status:

if $P_R(i) \geq P_L(i)+Pcr$ then check valve is open;

if $P_L(i-1) \geq P_R(i)+Pcr$ then adjacent check valve is open;

balance pressure between connected chamber and reset check valve to close; and recalculate $x(i)$, $P_R(i)$ and $P_L(i)$ until no more open check valve.

19. The system as set forth in claim 11 wherein the plurality of pumps define a force control system with a maximum pumping capability determined by a piston of each pump moving a maximum distance within each pump.

20. The system as set forth in claim 11 wherein the pump parameters include a piston mass parameter, a first piston travel parameter, a second piston travel parameter, and a mass parameter of the weight.

* * * * *